US007991244B2

(12) United States Patent
Youngers et al.

(10) Patent No.: US 7,991,244 B2
(45) Date of Patent: Aug. 2, 2011

(54) VARIABLE SKEW CORRECTION SYSTEM AND METHOD

(75) Inventors: Kevin Youngers, Greeley, CO (US); Maurizio Pilu, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1128 days.

(21) Appl. No.: 11/799,183

(22) Filed: Apr. 30, 2007

(65) Prior Publication Data

US 2008/0267502 A1 Oct. 30, 2008

(51) Int. Cl.
G06K 9/36 (2006.01)

(52) U.S. Cl. ....................................................... 382/289

(58) Field of Classification Search .................... 360/76; 348/583, E5.055; 382/289, 296; 712/E9.063; 713/503

See application file for complete search history.

(56) References Cited

U.S. PATENT DOCUMENTS

| | | | | |
|---|---|---|---|---|
| 5,191,438 A * | 3/1993 | Katsurada et al. | ............ | 382/290 |
| 5,764,383 A * | 6/1998 | Saund et al. | .................. | 358/497 |
| 5,818,976 A * | 10/1998 | Pasco et al. | .................... | 382/289 |
| 5,901,253 A * | 5/1999 | Tretter | ........................ | 382/289 |
| 5,940,544 A * | 8/1999 | Nako | ............................ | 382/293 |
| 6,310,984 B2 * | 10/2001 | Sansom-Wai et al. | ........ | 382/289 |
| 6,430,320 B1 * | 8/2002 | Jia et al. | ........................ | 382/289 |
| 6,529,643 B1 * | 3/2003 | Loce et al. | .................... | 382/300 |
| 6,549,680 B1 | 4/2003 | Revankar | | |
| 6,862,375 B1 * | 3/2005 | Keithley et al. | ............... | 382/289 |
| 6,888,650 B1 | 5/2005 | Mizubata et al. | | |
| 7,120,314 B2 | 10/2006 | Schweid et al. | | |
| 7,133,573 B2 * | 11/2006 | Brugger et al. | ............... | 382/289 |
| 2001/0014183 A1* | 8/2001 | Sansom-Wai et al. | ........ | 382/289 |
| 2005/0225808 A1* | 10/2005 | Braudaway et al. | ......... | 358/3.26 |
| 2006/0256388 A1 | 11/2006 | Erol et al. | | |

* cited by examiner

Primary Examiner — Gregory F Cunningham

(57) ABSTRACT

A variable skew correction system comprises a de-skew application executable to transform scanned image data of a document exhibiting a variable skew condition to an output model representing a de-skewed image of the document by transferring pixel data for each of a plurality of raster lines of the scanned image data to the output model, wherein a variable spacing between at least two adjacent raster lines of the scanned image data is modified in the output model to correct non-linear distortion of the scanned image data.

22 Claims, 4 Drawing Sheets

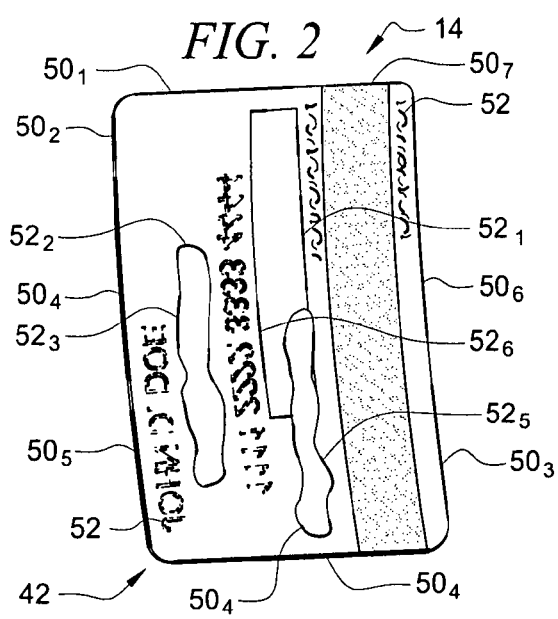
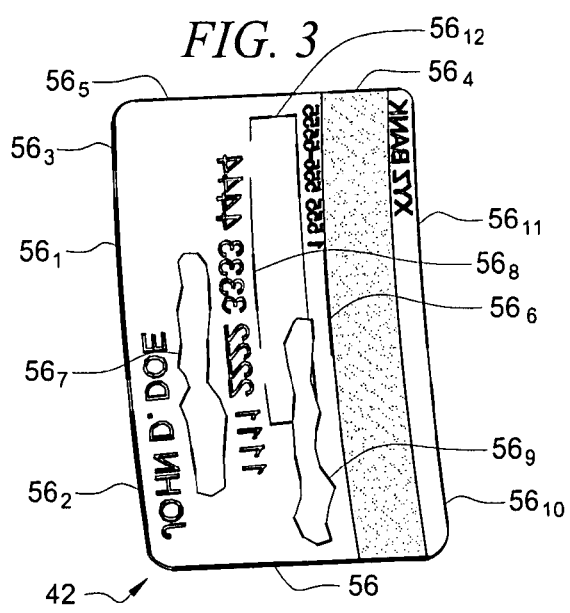
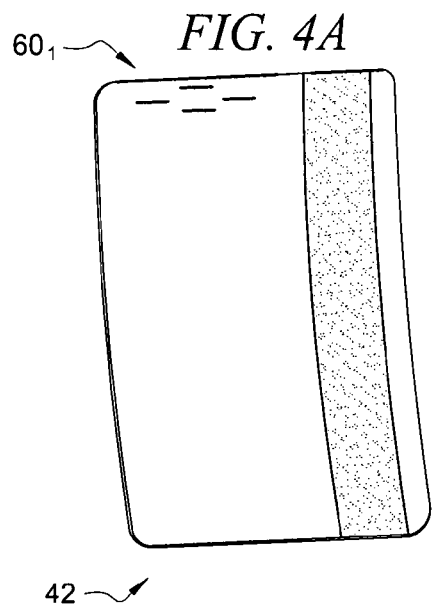
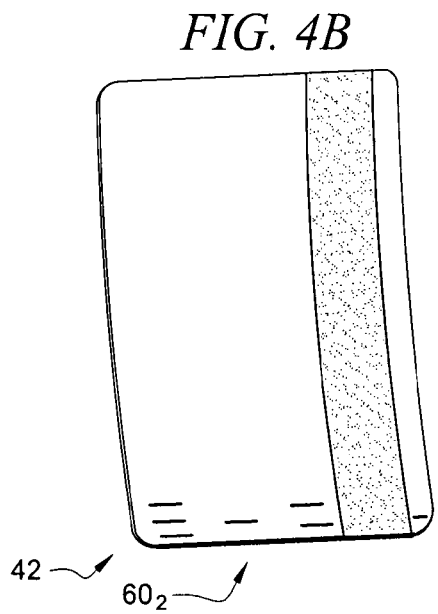

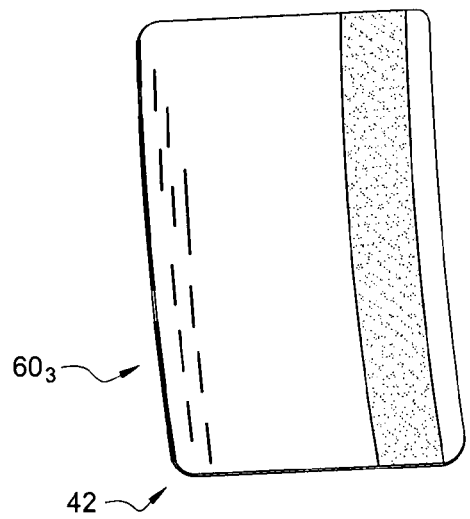
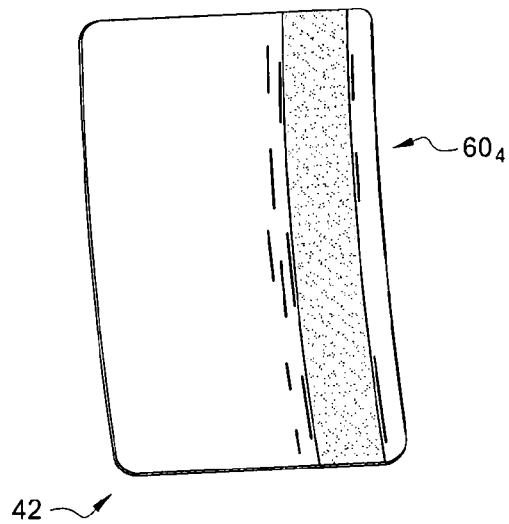
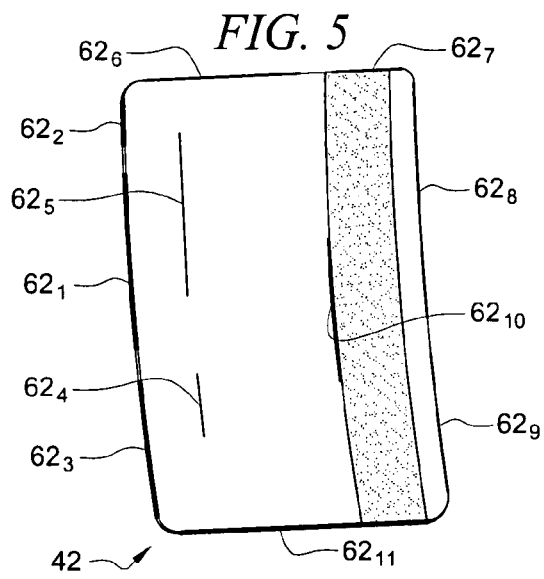
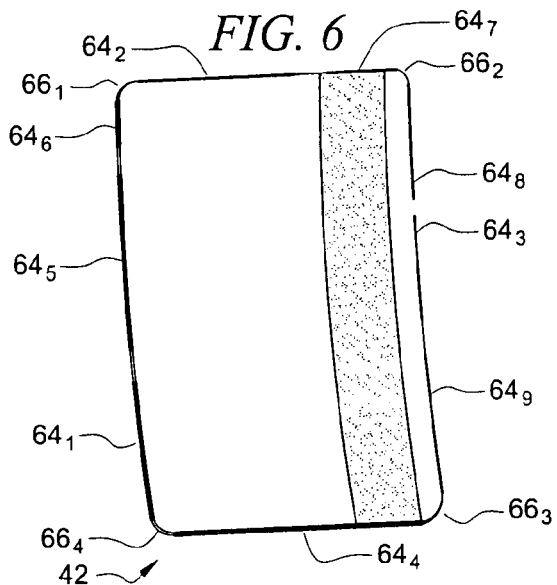

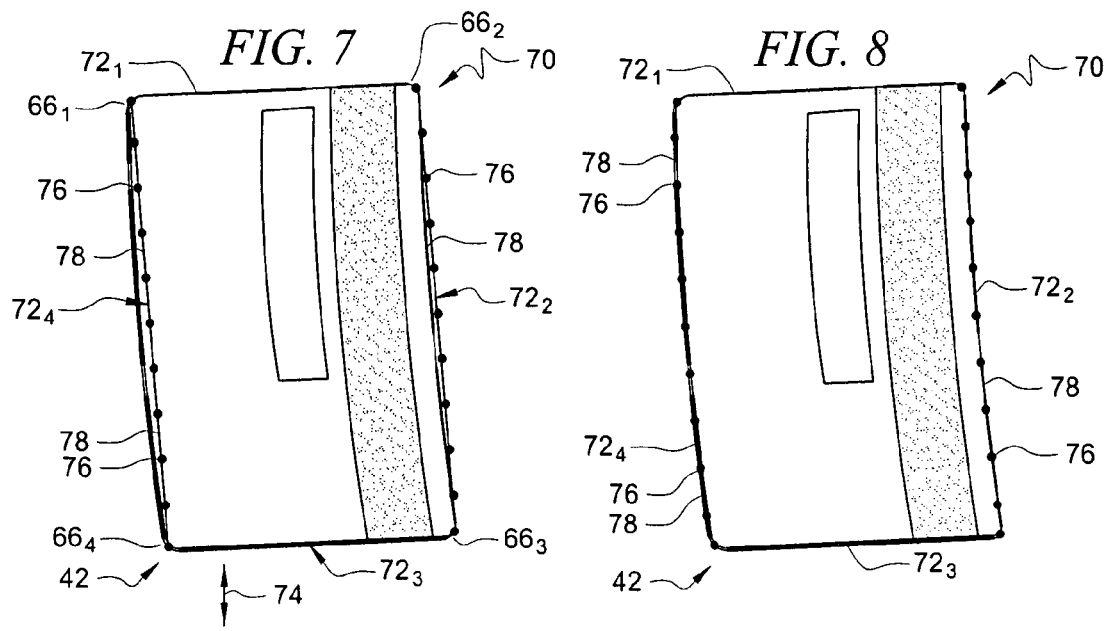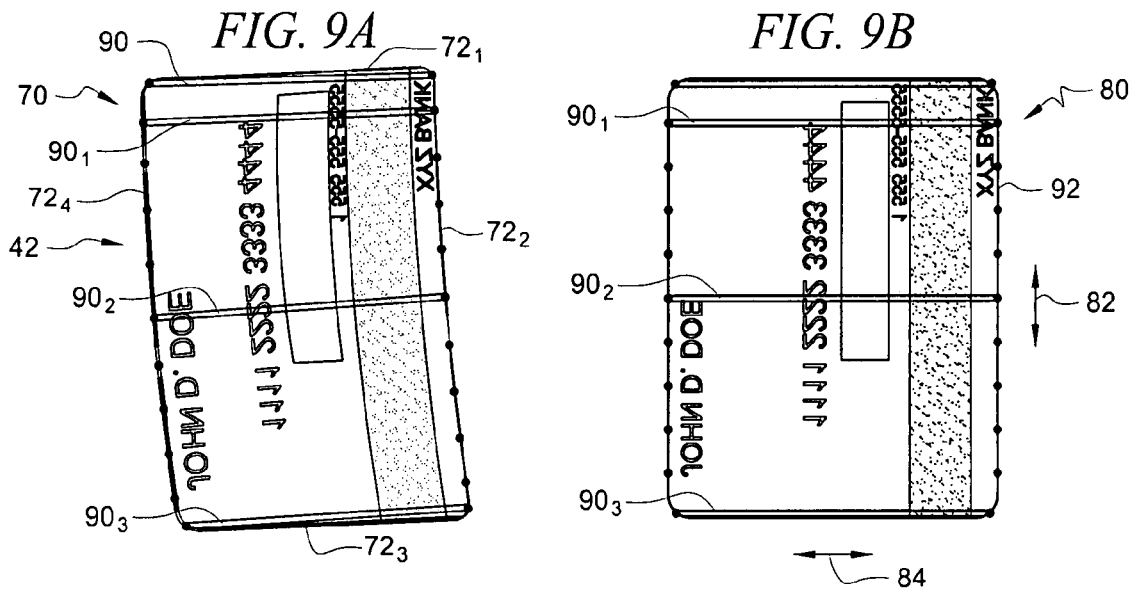

VARIABLE SKEW CORRECTION SYSTEM AND METHOD

BACKGROUND

In document scanners and other types of imaging devices, an image of a document is generally obtained scan line-by-scan line. For example, some document scanners comprise a feed mechanism that feeds a document to be scanned or imaged onto a platen and past a photosensitive element where image content is captured on a line-by-line basis as the document is fed past the photosensitive element. Such feed mechanisms generally comprise rollers or other types of elements that grip and/or otherwise engage the document to feed the document past the photosensitive element. However, during the feeding process, a variable skew or non-linear distortion condition may result if the document inadvertently moves relative to the feed mechanism while the document is being fed past the photosensitive element, thereby resulting in an image that has a curved or banana-shaped contour. For example, the variable skew condition is especially prevalent if the document contains embossed lettering or images (which creates friction relative to a platen across which the document is fed and/or results in uneven pressure being applied by the feed mechanism, thereby causing slippage between the document and the feed mechanism) or if the document is photo-quality paper, plastic or another type of medium having a generally smooth or slippery surface (which also results in slippage between the document and the feed mechanism).

BRIEF DESCRIPTION OF THE DRAWINGS

FIGS. 2-9B are diagrams illustrating an embodiment of a method of variable skew correction.

DETAILED DESCRIPTION OF THE DRAWINGS

Figure 1:
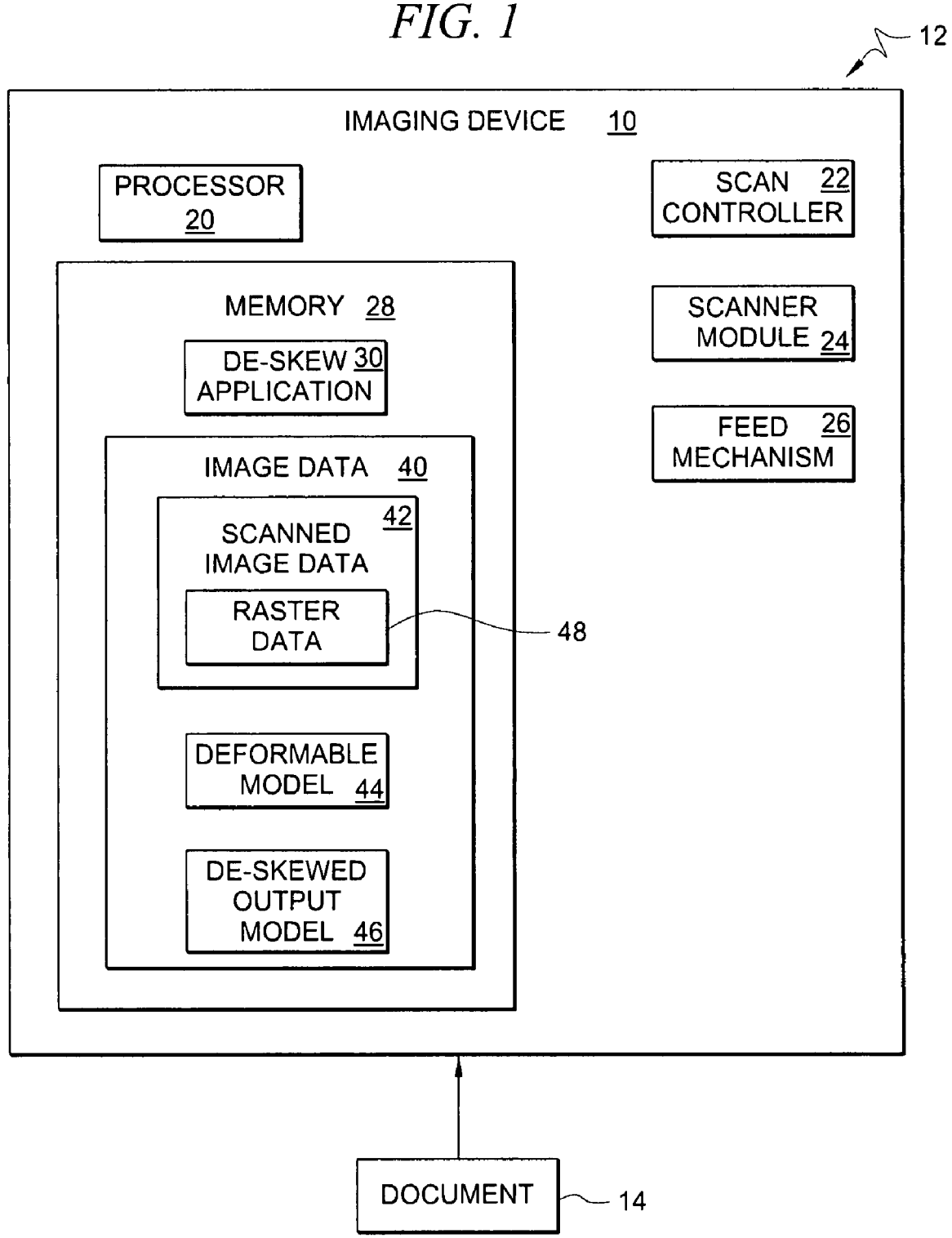
FIG. 1 is a block diagram illustrating an imaging device in which an embodiment of a variable skew correction system is employed to advantage.

FIG. 1 is a block diagram illustrating an imaging device 10 in which an embodiment of a variable skew correction system 12 is employed to advantage. Imaging device 10 may comprise any type of device for generating a scanned image of a document 14 such as, but not limited to, a copier, a desktop scanner, a facsimile device, and amulti-function device. Document 14 may comprise any type of object of which a scanned image is desired such as, but not limited to, a photograph, a text-based document, a credit card, and a business card.

In the embodiment illustrated in FIG. 1, imaging device 10 comprises a processor 20, a scan controller 22, a scanner module 24, and a feed mechanism 26. Scan controller 22 is used to control a scanning operation for producing a scanned image of document 14. For example, scanner module 24 may comprise a photosensor element, a light for illuminating document 14, a lens assembly for focusing light reflected by and/or transmitted through document 14 onto the photosensor and/or other elements used for generating a scanned image of document 14. Feed mechanism 26 may comprise one or more rollers or other devices used to feed document 14 past scanner module 24 for generating a scanned image thereof. In operation, scan controller 22 controls the operation of feed mechanism 26 and/or scanner module 24 to generate a scanned image of document 14.

In the embodiment illustrated in FIG. 1, system 12 comprises a de-skew application 30 executable to correct a variable skew condition associated with the scanned image of document 14 such that non-linear distortion in the scanned image of document 14 is adjusted and/or otherwise corrected to produce a scanned image representative of document 14. De-skew application 30 may comprise hardware, software, firmware, or a combination thereof. In FIG. 1, de-skew application 30 is illustrated as being stored in memory 28 so as to be accessible and executable by processor 20. However, it should be understood that de-skew application 30 may be otherwise located (e.g., even remote from imaging device 10).

In FIG. 1, memory 28 comprises image data 40 having information associated with the scanned and corrected images of document 14. For example, in the embodiment illustrated in FIG. 1, image data 40 comprises scanned image data 42, a deformable model 44, and a de-skewed output model 46. Scanned image data 42 generally comprises image data acquired from a scanning operation performed on document 14. For example, in some embodiments, scanning of document 14 is performed by a linear photosensor array on a scan line-by-scan line basis, thereby producing pixel values or raster data 48 corresponding to each scan line. Deformable model 44 comprises a model of document 14 generated by de-skew application 30 based on scanned image data 42 of document 14. As will be described in greater detail below, model 44 is deformed to correspond with and/or otherwise conform to the distorted and/or non-linear scanned image data 42 associated with document 14. De-skewed output model 46 comprises a model generated by de-skew application 30 representing a de-skewed image of document 14 as a result of de-skew application 30 transforming scanned image data 42 from deformable model 44 to output model 46.

FIGS. 2-9B are diagrams illustrating an embodiment of a method of variable skew correction using de-skew application 30. In the embodiment illustrated in FIGS. 2-9B, document 14 is illustrated as a credit card. However, it should be understood that the described method may be used for other types of documents 14. Referring to FIG. 2, the scanned image of document 14 is indicative of a is non-linear and/or variable skew distortion condition. De-skew application 30 accesses scanned image data 42 corresponding to document 14 and performs an edge detection operation on scanned image data 42. In some embodiments, scanned image data 42 may be downsampled prior to being processed using de-skew application 30 to facilitate faster image correction processing. As illustrated in FIG. 2, the edge detection operation performed by de-skew application 30 is used to locate high contrast distinctions between various portions of scanned image data 42. Thus, for example, the edge detection operation may locate transition indications $50_1$-$50_7$ (which may represent a high contrast transition related to an edge of document 14) as well as transition indications $52_1$-$52_6$ representing high contrast transitions within various areas of scanned image data 42. Thus, it should be understood that the edge detection operation is used to detect contrasting areas of image content that may be subsequently used to determine and/or otherwise identify the physical edges of document 14. In FIG. 2, a small representative sample of transition indications are illustrated for ease of illustration and description; however, it should be understood that the quantity of detected contrasting areas may vary. Further, a variety of different types of edge detection methods may be used such as, but not limited to, a simplified Canny edge detection method.

Referring to FIG. 3, de-skew application 30 performs a linking operation using the high contrast transition indications detected during the edge detection process (e.g., indications 50 and 52 of FIG. 2) to generate linear line segments $56_{1-12}$. For example, in some embodiments, opposite and/or extreme ends of a particular string of high contrast transition indications 50 and/or 52 are joined by a linear line such that edge points falling within a predetermined threshold distance relative to the linear line are associated with the generated linear line. Accordingly, if edge points for particular transitions 50 and 52 fall outside the predetermined threshold distance, such edge points are split and/or otherwise associated with a different linear line. Thus, in some embodiments, the linear line segmentation process may be performed by an iterative split and merge process such that orthogonal distances between edge points and linear lines are used to associate the various transition indication 50 and/or 52 points with particular linear lines. In FIG. 3, a small representative sample of linear line segments 56 are illustrated for ease of illustration and description; however, it should be understood that the quantity of linear line segments may vary.

Referring to FIGS. 4A-4B, de-skew application 30 performs a partitioning and grouping operation using the linear line segments 56 obtained as illustrated in FIG. 3. For example, as illustrated in FIGS. 4A-4B, the linear line segments are partitioned and/or grouped by their relative locations such as top (FIG. 4A), bottom (FIG. 4B), left (FIG. 4C), and right (FIG. 4D). Thus, referring to FIGS. 4A-4D, the line segments 56 (FIG. 3) are partitioned and grouped by de-skew application 30 into line segment groups $60_1$, $60_2$, $60_3$, and $60_4$, corresponding to the top, bottom, left, and right portions of scanned image data 42, respectively. For ease of illustration and description, various image features represented in FIGS. 2 and 3 (e.g., name lettering and number designations) are omitted from FIGS. 4A-8).

Referring to FIG. 5, de-skew application 30 analyzes the grouped line segments $60_1$-$60_4$ and groups those of line segments $60_1$-$60_4$ that are generally collinear. For example, in some embodiments, a method such as a recursive depth-first tree search of the linear segments sorted horizontally (for the top and bottom groups $60_1$ and $60_2$) or vertically (for the left and right side groups $60_3$ and $60_4$) may be performed to group those segments that are generally collinear. In operation, various types of perceptual criteria may be used to determine whether two or more line segments are collinear such as, but not limited to, proximity relative to length, alignment of ends of particular line segments and/or the angular orientation of such line segments. In FIG. 5, various line segments determined to be generally collinear have been grouped and are represented by grouped line segments $62_1$-$62_{11}$. However, it should be understood that there may be a greater or fewer quantity of collinear line segments.

Referring to FIG. 6, de-skew application 30 uses the collinear groupings of line segments (grouped line segments $62_{1-11}$ of FIG. 5) to determine and/or estimate the locations of the sides of document 14. For example, in some embodiments, the linear segments (e.g., actual linear segments and/or projected linear segments) of the various collinear line segment groups $62_{1-11}$ are analyzed relative to each other to locate and/or estimate the locations of the sides of document 14. In some embodiments, each of the various collinear line segment groups $62_{1-11}$ are used to determine and/or estimate the locations of the sides of document 14 and the results scored using different criteria. For example, in some embodiments, one of each of the collinear line segments groups from the top, bottom, left side and right side are used to calculate an area formed by the selected collinear line segment groups. The intersections of the various collinear line segment groups may also be analyzed. The calculated areas and/or intersection locations may be scored (e.g., larger areas having a higher score as being indicative of the boundaries or edges of document 14) to determine and/or estimate the locations of the sides of document 14. However, it should be understood that other methods or processes may be used. Thus, for example, referring to FIG. 6, the analysis of the collinear line segment groups $62_{1-11}$ are used to define linear line segments $64_1$-$64_9$ representing the sides of document 14, whereas the intersections the linear line segments $64_1$-$64_9$ may be used to define the corners $66_1$-$66_4$ of document 14.

Referring to FIG. 7, de-skew application 30 generates a model 70 based on the determined locations corners $66_1$-$66_4$. For example, in the embodiment illustrated in FIG. 7, model 70 comprises linear lines $72_1$-$72_4$ having their respective vertices located at corners $66_1$-$66_4$. In the embodiment illustrated in FIG. 7, lines $72_1$ and $72_3$ correspond to edges of document 14 that were located perpendicular to a scanning direction of document 14 indicated by arrow 74 in FIG. 7 (e.g., if the variable skew condition had not resulted, sides $72_1$ and $72_3$ would have been located and/or positioned substantially parallel to a photosensor array during the scanning process). Thus, based on the foregoing, de-skew application 30 generates lines $72_2$ and $72_4$ of model 70 formed by piecewise linear segments defined and/or joined by a predetermined quantity of nodes. Thus, for example, in FIG. 7, lines $72_2$ and $72_4$ are each defined by a same quantity of nodes 76 having an equi-distant spacing therebetween along the respective line $72_2$ and $72_4$ (the spacing between nodes 76 along line $72_2$ being less than the spacing between nodes 76 of line $72_4$ because the image data along line $72_2$ is compressed whereas the image data along line $72_4$ is expanded resulting from the variable skew condition). Thus, lines $72_2$ and $72_4$ are formed having a plurality of line segments 78 having respective nodes 76 for endpoints thereof.

Referring to FIG. 8, model 70 is deformed to correspond with and/or otherwise conform to scanned image data 42. For example, referring to FIG. 8, sides $72_2$ and $72_4$ are deformed to correspond to edges of scanned image data 42 having a curvature and/or non-linear form by effectively transitioning nodes 76 and corresponding line segments 78 to the outline or sides of scanned image data 42.

Referring to FIGS. 9A and 9B, de-skew application 30 transforms scanned image data 42 corresponding to the deformed model 70 to an output model 80 generated by de-skew application 30. Output model 80 is used to represent and/or act as a placeholder for the transformation of scanned image data 42 from deformed model 70 to output model 80. De-skew application 30 generates output model 80 as a representative indication of the size of document 14 based on scanned image data 42. For example, in some embodiments, de-skew application 30 computes an average height for output model 80 as indicated by the direction corresponding to arrow 82 based on an average dimension of lines $72_2$ and $72_4$ (FIG. 7), and computes an average width for model 80 in a direction indicated by arrow 84 based on an average of a dimension of lines $72_1$ and $72_3$ (FIG. 7). However, it should be understood that output model 80 may be otherwise generated and/or determined.

Referring to FIGS. 9A and 9B, de-skew application 30 transforms scanned image data 42 from deformed model 70 to output model 80 by transferring pixel values for each of a plurality of raster data lines 90 of scanned image data 42 from deformed model 70 to output model 80. For example, as illustrated in FIGS. 9A and 9B, image data 42 located along line $72_2$ is generally compressed while image data 42 located along line $72_4$ is generally expanded resulting from the variable skew condition during scanning of document 14. Thus, as illustrated in FIG. 9A, the distance between adjacent raster data lines 90 varies from line $72_2$ to line $72_4$. In operation, pixel values associated with raster lines 90 are moved and/or transferred from deformed model 70 to output model 80 using a one-to-one correspondence between models 70 and 80. For example, in some embodiments of operation, the locations of raster data lines 90 in output model 80 are spaced apart by one pixel along a side 92 of model 80 such that a one-to-one correspondence between raster data lines 90 from deformed model 70 are established with the locations of raster data lines 90 and output model 80. Thus, based on the selected locations for raster data lines 90 in output model 80, pixel values for a corresponding quantity of raster data lines 90 are transferred from model 70 to model 80. Thus, it should be understood that the pixel spacing and/or pixel-to-pixel ratio between adjacent raster data lines 90 in model 70 along a scan direction of document 14 (e.g., as indicated by arrow 74 in FIG. 7) will vary from line $72_2$ to line $72_4$ (i.e., the pixel spacing at opposite ends of raster data lines 90 in model 70 will vary (e.g., the pixel spacing along line $72_2$ may be different, probably smaller, than the pixel spacing along line $72_4$)) because of the compression/expansion of the distorted image data.

Thus, in operation, de-skew application 30 acquires pixel values for a particular raster data line 90 in model 70 and transfers the pixel values to output model 80 at a corresponding location of the selected raster data line 90 in output model 80. De-skew application 30 performs the image data transformation by transitioning along a scan direction of the scanned image data 42 to capture and/or otherwise acquire pixel values for raster data lines 90 in model 70 and transfer the pixel values to output model 80. Thus, it should be understood that the transitioning process through the scanned image data 42 in model 70 may be on a variable pixel-by-pixel ratio based on the compressed/expanded data condition. In FIGS. 9A and 9B, three raster data lines $90_1$-$90_3$ are represented; however, it should be understood that the quantity of raster data lines will vary.

It should be understood that in the described method, certain functions may be omitted, accomplished in a sequence different from that depicted in FIGS. 2-9B, or performed simultaneously. Also, it should be understood that the methods depicted in FIGS. 2-9B may be altered to encompass any of the other features or aspects as described elsewhere in the specification. Further, embodiments may be implemented in software and can be adapted to run on different platforms and operating systems. In particular, functions implemented by de-skew application 30, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, orsemiconductor system, apparatus, device, or propagation medium.

What is claimed is:

1. A variable skew correction system, comprising:
    a processor; and
    a de-skew application executable by the processor to transform scanned image data of a document exhibiting a variable skew condition to an output model representing a de-skewed image of the document by transferring pixel data for each of a plurality of raster lines of the scanned image data to the output model, wherein a variable spacing between at least two adjacent raster lines of the scanned image data is modified in the output model to correct non-linear distortion of the scanned image data.

2. The system of claim 1, wherein the de-skew application is configured to transform the scanned image data to the output model at a variable pixel-by-pixel ratio between at least two opposing sides of the scanned image data.

3. The system of claim 1, wherein the de-skew application is configured to perform edge detection on the scanned image data to generate the output model.

4. The system of claim 1, wherein the de-skew application is configured to partition and group linear segments of the scanned image data to determine sides for the output model.

5. The system of claim 1, wherein the de-skew application is configured to analyze intersections of linear segments of the scanned image data to determine sides for the output model.

6. The system of claim 1, wherein the de-skew application is configured to position the at least two adjacent raster lines in the output model with a uniform spacing therebetween.

7. The system of claim 1, wherein the de-skew application is configured to generate another model deformed to the scanned image data to determine at least one dimension of the output model.

8. A variable skew correction method, comprising:
    generating, with a processor, an output model representing a de-skewed image of a document based on scanned image data of the document, the scanned image data indicating a variable skew condition;
    deforming, with a processor, another model to conform to the scanned image data; and
    transforming, with a processor, the scanned image data from the deformed model to the output model to correct non-linear distortion of the scanned image data.

9. The method of claim 8, further comprising transforming the scanned image data to the de-skewed model at a variable pixel-by-pixel ratio between at least two opposing sides of the scanned image data.

10. The method of claim 8, further comprising performing edge detection on the scanned image data to generate the output model.

11. The method of claim 8, further comprising partitioning and grouping linear segments of the scanned image data to determine sides for the output model.

12. The method of claim 8, further comprising analyzing intersections of linear segments of the scanned image data to determine sides for the output model.

13. The method of claim 8, further comprising transferring raster lines of the scanned image data from the deformed model to the output model.

14. The method of claim 8, wherein deforming the another model comprises deforming at least one side of the another model to a side of the scanned image data exhibiting a curvature.

15. A variable skew correction system, comprising:
    an imaging device having a de-skew application executable by a processor to:
    generate an output model representing a de-skewed image of a document based on scanned image data of the document, the scanned image data indicating a variable skew condition;
    deform another model to conform to the scanned image data; and
    transform the scanned image data from the deformed model to the output model to correct non-linear distortion of the scanned image data.

16. The system of claim 15, wherein the de-skew application is configured to transform the scanned image data to the output model at a variable pixel-by-pixel ratio between at least two opposing sides of the scanned image data.

17. The system of claim 16, wherein the de-skew application is configured to perform edge detection on the scanned image data to generate the output model.

18. The system of claim 16, wherein the de-skew application is configured to partition and group linear segments of the scanned image data to determine sides for the output model.

19. The system of claim 16, wherein the de-skew application is configured to analyze intersections of linear segments of the scanned image data to determine sides for the output model.

20. The system of claim 16, wherein the de-skew application is configured to transfer raster lines of the scanned image data from the deformed model to the output model.

21. The system of claim 1, wherein the de-skew application is configured to calculate areas formed by linear segments of the scanned image data to determine sides for the output model.

22. The system of claim 7, wherein the transferring the pixel data includes transferring the pixel data from the deformed model to the output model.

* * * * *